Jan. 3, 1967  E. L. HOLT ET AL  3,296,025
METHOD FOR MAKING POROUS MEMBRANE ELECTRODE
Filed Jan. 10, 1963
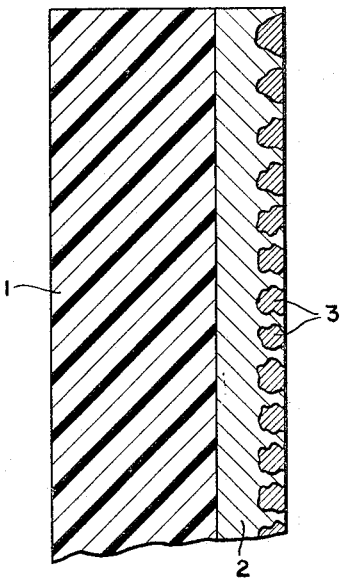
EUGENE L. HOLT
MORTON BELTZER   Inventors
By W. O. T Heilman
Patent Attorney

# United States Patent Office 3,296,025
Patented Jan. 3, 1967

3,296,025
METHOD FOR MAKING POROUS
MEMBRANE ELECTRODE
Eugene L. Holt, Forest Hills, and Morton Beltzer, New York, N.Y., assignors to Esso Research and Engineering Company, a corporation of Delaware
Filed Jan. 10, 1963, Ser. No. 250,515
6 Claims. (Cl. 117—227)

This invention relates to fuel cells, particularly to a new and improved fuel cell electrode and to methods of producing such electrode, more particularly this invention relates to a new catalyzed metal coated membrane electrode and electrode-electrolyte container system.

It is an object of this invention to provide a highly efficient electrode and a cell. The cell comprises an electrolyte container and two catalyst electrodes. The electrolyte container comprises a porous organic membrane, the electrodes are metal coatings on said membrane. In operation the membrane would be saturated with an aqueous electrolyte that would afford ionic conductance between the two electrodes. The electrodes would also be in electrical communication through means external to the electrolyte.

Prior to the present invention the only methods for catalyst deposition were electrodeposition, or pressing into the heat softened membrane. Electrodeposition is limited in that all catalysts cannot be electrodeposited. The alternate method of heat softening followed by pressing alters the membrane greatly and destroys part of the membrane pore structure, thereby increasing the electrolytic resistance of the membrane. Another prior art method that could be used would be to add a powdered catalyst to a binder, coat the membrane with the paste of catalyst and binder and sinter the combination. However, the sintering step would substantially destroy the porosity of the membrane and the binder would increase the resistance of the electrode.

In a membrane electrode system, it is important that the system remain porous to allow the reactants to make contact. The metal clad membranes may be produced by any of the methods known in the art. The porous membranes may be coated with any electroconductive metal such as silver, platinum, gold, palladium, nickel and copper.

By the instant process a porous membrane or porous metal clad membrane is coated with a paste comprising a finely divided catalyst and a liquid. The coating is partially dried by evaporating off the liquid either at room temperature, by gentle warming, by reducing the pressure over the structure or by a combination of such steps. The porous membrane is coated with from about 0.1 to about 20 mg./cm.$^2$ of catalyst, preferably from 0.2 to 15 mg./cm.$^2$. After the membrane is coated with the paste and the paste is partially dried, the membrane is covered with a smooth protective metal sheet. The sheet covered membrane is then, at room temperature, subjected to a pressure of from 250 to 20,000 p.s.i., preferably from 750 to 10,000 p.s.i.

In another embodiment of this invention a membrane having a metal coating on both sides is subjected to the same process. The same or different catalyst pastes may be applied to the metal coatings of the membrane. In this manner a cell may be made. The membrane will serve as the electrolyte chamber and one metal clad surface will act as the anode and the other metal surface will function as the cathode. The anode and cathode need not have the same catalyst impressed thereon.

By the instant technique, finely divided catalysts other than metal catalysts may be used. Catalysts such as metals, alloys of metals, physical mixtures of metals, salts of metals and mixtures of metals and metal salts may be applied by the instant pressing method. The catalysts may be prepared by grinding a large sample or by chemical reduction of the catalyst from solution, for example by $NaBH_4$ reduction of metal salts. The catalysts if necessary may be activated before being pressed. The following is a representative list of catalysts that can be used in the instant process: platinum, gold, osmium, nickel, molybdenum, vanadium, iridium, manganese, mixtures of the foregoing metals, alloys such as Pt-Ir, Au-Ir, Pt-Mo, Pt-Fe-Au and compounds such as cobalt-molybdate, silica and alumina. The foregoing is obviously not an exhaustive list but serves only to indicate the wide variety of catalysts that may be used in the operation of this invention.

Referring now to the accompanying drawing which is a vertical cross section of one embodiment of this invention.

There is first shown a porous membrane 1 having a metal coating 2 thereon said metal coating having a catalytic material 3, pressed thereon.

The following examples are submitted for illustration only and are not to be construed as a limitation of the scope of this invention which is particularly set forth in the claims.

Example 1

A 25 cm. sq. metal coated membrane was coated with a paste comprising a mixture of water and Pt-Mo catalyst. The paste, containing 25 mg. of Pt-Mo, was spread on the metal coated membrane and partially dried by evaporation. A platinum metal plate was placed upon the paste coated membrane. The membrane was then placed in a press and subjected to a pressure of 5000 p.s.i. The membrane was then removed from the press and the protective platinum plate was taken off the membrane.

Example 2

A gold coated membrane was coated with a Pt black-$H_2O$ slurry, partially dried and pressed at 2000 p.s.i. A total of 8 grams/ft.$^2$ of Pt was deposited, forming a mechanically stable, adherent coating. This electrode was tested in 1 M $CH_3OH$ and 3.7 M $H_2SO_4$ at 60° C. and gave a performance equal to Pt black on other electrode structures. The following table shows the performance obtained:

| Amps./ft.$^2$: | Volts polarized from theor. $CH_3OH$ |
|---|---|
| 30 | 0.59 |
| 60 | 0.61 |
| 120 | 0.64 |
| 180 | 0.66 |
| 240 | 0.69 |
| 300 | 0.70 |

What is claimed is:
1. A method of making a porous membrane electrode which comprises coating a porous membrane with a paste comprising a finely divided catalyst, and pressing said catalyst into said membrane at room temperature and a pressure of about 250 to 20,000 p.s.i.

2. A method as defined by claim 1 wherein said paste is substantially free of binder.

3. A method as defined by claim 1 wherein said finely divided catalyst is Pt-black.

4. A method as defined by claim 1 wherein said catalyst is a mixture of Pt and Mo.

5. A method as defined by claim 1 wherein said porous membrane is metal clad.

6. A method as defined by claim 5 wherein said metal is gold.

References Cited by the Examiner

UNITED STATES PATENTS 3,134,697　5/1964　Niedrach _____ 136—86

OTHER REFERENCES

Justi et al.: J. Elect. Chem. Soc., November 1961 (pages 1073 to 1079, page 1079 relied on).

ALFRED L. LEAVITT, *Primary Examiner.*

W. L. JARVIS, *Examiner.*